3,042,630
COMPOSITIONS CONTAINING BIS(3-METHOXY-PROPYLIDENE)PENTAERYTHRITOL

Walter S. Ropp, Hockessin, Wilmington, Del., assignor to Hercules Powder Company, Wilmington, Del., a corporation of Delaware
No Drawing. Filed May 21, 1959, Ser. No. 814,675
6 Claims. (Cl. 260—2)

The present invention relates to novel compositions of matter that are useful in the coatings and impregnating arts. More particularly, it relates to coating and impregnating compositions that are convertible by heat into substantially infusible film.

It is known that diallylidene pentaerythritol, the compound having the formula

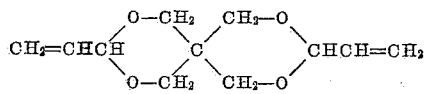

can be prepared by reacting pentaerythritol and acrolein and that it can be condensed by heating in the presence of acids with various polyhydric compounds, e.g., pentaerythritol and monoallylidene pentaerythritol, to form substantially infusible solids. The exact mechanism of this reaction is unknown but it has been established on the basis of reasonable evidence that the primary reaction that occurs is the condensation of the allyl double bonds of diallylidene pentaerythritol with the hydroxyl groups of the polyhydric compound to form a complex polyetheracetal. Although such compositions have many uses in the plastics and coatings arts, they possess the disadvantage of releasing acrolein when mixed with water or heated to effect cure, and even though the amount of acrolein released is quite small, it is sufficient to annoy and irritate persons who use the compositions.

In accordance with the present invention it has been found surprisingly that bis(3-methoxypropylidene)pentaerythritol, the compound which is formed by the addition of two moles of methanol to one mole of diallylidene pentaerythritol, even though it is not unsaturated will also react with various polyhydric compounds in the presence of an acid under conditions permitting the evaporation of methanol to produce products of the same structure as produced by the condensation of diallylidene pentaerythritol with a polyhydric alcohol. The exact mechanism of the reaction likewise is not known but it involves the release of methanol and thus it is certain that methanolysis in some way takes place; possibly, in the presence of acid, methanol is released from the bis(3-methoxypropylidene)pentaerythritol to form diallylidene pentaerythritol as a transitory and ephemeral intermediate. However, there is no evolution of acrolein when the dimethoxy compound is heated as is the case when diallylidene pentaerythritol is heated.

Because of the fact that it is necessary for methanol to be released, the reaction of bis(3-methoxypropylidene)pentaerythritol with the polyhydric compound cannot conveniently be performed in bulk. However, it is adaptable to the coating and impregnating arts which are characterized by application of the films to a substrata because in such case methanol is readily evolved. Thus, the aforesaid discovery can be translated into coating and impregnating compositions of practical significance. Furthermore, since bis(3-methoxypropylidene)pentaerythritol is soluble in warm water, which diallylidene pentaerythritol is not, the coating compositions can be applied in the form of wholly aqueous solutions provided the polyhydric compound employed as a co-reactant is also water-soluble.

In precise terms, the invention is directed to coating compositions comprising (1) bis(3-methoxypropylidene)pentaerythritol, (2) a polyhydric compound having more than two primary hydroxyl groups per molecule and having a primary hydroxyl content of at least 10%, and (3) an acid-acting condensation catalyst, in which composition ingredients (1) and (2) are present in approximately stoichiometrically equivalent amounts.

In a preferred embodiment of the invention the polyhydric compound is one which is water-soluble, thus permitting the formulation of coating compositions in the form of aqueous solutions that can be converted to films that are relatively unaffected by water.

The invention is illustrated by the following example in which parts and percentages are by weight unless otherwise specified.

Example 1

Four hundred ninety (490) parts of maleic anhydride, 155 parts of ethylene glycol, and 786 parts of pentaerythritol were charged to a reaction vessel equipped with a thermometer, carbon dioxide sparge tube and stirrer. The mixture was agitated while introducing carbon dioxide and heating to 150° C. After 9 hours of reaction at this temperature during which the water of reaction was allowed to evolve, a balsamic ester having an acid number of 36 and analyzing 23% hydroxyl was obtained. The ester was miscible with water in nearly all proportions.

In a separate vessel 45 parts of bis(3-methoxypropylidene)pentaerythritol and 24.8 parts of the above ester were dissolved in 30.2 parts of warm (60° C.) water containing 0.6 part of sulfuric acid. A 5-mil film of the solution was next cast on a glass plate and baked for ½ hour at 150° C. with no noticeable evolution of acrolein. The resulting film was extremely hard, tough, mar-resistant, and water-insensitive, the latter property being shown by the fact that there was no apparent change in appearance or mar-resistance of the film after immersion in water for 3 days. Analysis of the film showed that the double bonds of the ester had not entered into the reaction by which the film was formed.

Examples 2–6

Polyhydric compounds of the following description were substituted on an equal hydroxyl basis for the ester employed in Example 1.

Example 2: The reaction product of 3 moles of trimethylolpropane and 2 moles of maleic anhydride—acid number 5, hydroxyl content 11%.

Example 3: The reaction product of 3 moles of dipentaerythritol and 2 moles of adipic acid—acid number 5, hydroxyl content 24.2%.

Example 4: Pentaerythritol.

Example 5: Trimethylolpropane.

Example 6: Bis(pentaerythritol)sebacate.

Infusible films were formed from the compositions of Examples 2 through 6 by heating as described in Example 1.

The preceding example is merely illustrative of the invention and its advantages. There are, obviously, many other variations in the invention, particularly with respect to the polyhydric compound and acid-acting condensation catalyst, that can be made as will be apparent from the following description.

The essential characteristic of the polyhydric compound is that it comprises at least 10% primary hydroxyl groups (that is to say, that at least 10% of the polyhydric compound by weight be composed of unreacted hydroxyl groups attached to primary carbon atoms) and that it have more than 2 primary hydroxyl groups per molecule. Typical polyhydric compounds of simple structure that can be used, singly or in admixture, are trimethylolethane, trimethylolpropane, pentaerythritol, dipentaerythritol, and others in which 3 or more primary hydroxyl groups are attached to a hydrocarbon or oxahydrocarbon nucleus. The use of dihydric alcohols is, however, not excluded entirely because such alcohols, e.g., ethylene glycol, propylene glycol, triethylene glycol, etc. can be used in conjunction with polyhydric alcohols of greater functionality. For instance, a mixture of one mole of pentaerythritol and 2 moles of ethylene glycol has an average functionality of 2.67 and thus such a mixture is useful as the polyhydric compound in the practice of the invention.

Polyhydric compounds of more complex structure can also be used. For instance, the polyhydric compound can be a partial ester of a polyhydric alcohol, such as those above named, with a monocarboxylic or dicarboxylic acid. The examples have, in fact, illustrated the use of such partial esters including esters prepared by the esterification of pentaerythritol and ethylene glycol with less than equivalent amounts of dibasic acids including maleic acid, adipic acid, and phthalic acid. There may also be used partial esters of such polyhydric alcohols with monobasic acids such as benzoic acid, acetic acid, propionic acid, phenylacetic acid, butyric acid, and the like provided such esters meet the requirement of containing more than 2 primary hydroxyl groups per molecule and comprise at least 10% primary hydroxyl groups.

The acid-acting condensation catalysts useful in the invention are any of those acid-acting compounds that are conventionally used as catalysts in condensation reactions generally. Included in this category are sulfuric acid, p-toluenesulfonic acid, diethyl sulfate, etc. Sulfuric acid is normally preferred since it is an effective catalyst that is available at low cost.

In preparing the compositions of the invention it is merely necessary to mix the three specified components, the bis(3-methoxypropylidene)pentaerythritol and the polyhydric compound being employed in such proportions that there is provided by the dimethoxyl compound approximately one potential allyl group for each hydroxyl group of the polyhydric compound. Any unsaturated groups, ether linkages, ester groups, secondary hydroxyl groups, etc. present in the polyhydric compound do not influence the proportions because such groups do not take part in the reaction by which the compositions are converted to infusible solids. The amount of catalyst required is normally quite small. An amount ranging from about 0.5 to 3% of the combined weight of the dimethoxy compound and the polyhydric compound is normally sufficient.

To convert the composition of the invention into substantially infusible, substantially insoluble solids, it is necessary to heat them under conditions permitting the evaporation of methanol to a temperature ranging from about 100° to about 180° C., the optimum temperature in each instance depending upon such factors as the amount of catalyst, the presence or absence of a vehicle, and the time of heating. The necessity of releasing methanol, which is a product of the curing reaction, restricts the use of the composition from the practical standpoint to coating and impregnating applications for in these applications there is ample opportunity for methanol to evaporate.

Since their primary utility is in the coating and impregnating art, the compositions are often employed in the form of a dispersion or solution in an inert diluent to provide a low viscosity for application purposes. The diluent can be an organic liquid such as an ester, a ketone, or a hydrocarbon or even a volatile alcohol but because the polyhydric compounds that are used in preparing the compositions have a normal affinity for water, and in fact many are soluble in water, due to the presence of free hydroxyl groups, it is particularly convenient and desirable from cost and safety considerations to use water as at least a portion of the inert diluent. Since bis(3-methoxypropylidene)pentaerythritol is soluble in water with slight warming, it is even possible by employing a polyhydric compound that is also water-soluble to prepare aqueous solutions of the compositions of the invention. The preceding examples have, in fact, illustrated the preparation of aqueous solutions and their use as coating compositions to produce infusible films, some of which have excellent resistance to water despite the hydrophilic nature of the film-forming constituents.

The coating compositions prepared as described can be used per se as coating, impregnating, or sizing compositions. They may also be used in conjunction with other water-soluble or compatible film-formers such as, for example, methylcellulose, gum arabic, and the like.

The compositions of the invention can also be compounded by conventional procedures, with or without a diluent, with various other ingredients that are useful in the coating art including, by way of for example, dyes, pigments, plasticizers, opacifiers, fillers, and the like.

The character and quality of the infusible films prepared from the compositions of the invention will of course vary according to the polyhydric compound that is employed in making the compositions. Many of the compositions, however, produce films that are extremely resistant to both water and organic solvents and thus have a wide range of application.

What I claim and desire to protect by Letters Patent is:

1. A composition comprising (1) bis(3-methoxypropylidene)pentaerythritol; (2) an aliphatic polyhydric compound having more than 2 primary hydroxy groups per molecule and comprising at least 10% primary hydroxyl groups; and (3) an acidic condensation catalyst, components (1) and (2) being present in approximately stoichiometrically equivalent amounts.

2. A composition according to claim 1 in which the polyhydric compound is a polyhydric alcohol.

3. A composition according to claim 1 in which the polyhydric compound is a partial ester of pentaerythritol produced by reaction of ingredients including pentaerythritol, ethylene glycol and maleic acid.

4. A composition according to claim 1 in which the acidic condensation catalyst is sulfuric acid.

5. A coating composition comprising the composition of claim 1 and an aqueous vehicle.

6. A composition comprising (1) bis(3-methoxypropylidene)pentaerythritol; (2) a polyhydric compound having more than 2 primary hydroxy groups per molecule and comprising at least 10% primary hydroxyl groups, said compound being selected from the group consisting of pentaerythritol, dipentaerythritol, trimethylolethane, trimethylolpropane, and partial esters thereof; and (3) an acid condensation catalyst, components (1) and (2) being present in approximately stoichiometrically equivalent amounts.

References Cited in the file of this patent

UNITED STATES PATENTS

| | | |
|---|---|---|
| 2,913,434 | Guest et al. | Nov. 17, 1959 |
| 2,915,498 | Kraft | Dec. 1, 1959 |

OTHER REFERENCES

Schulz et al.: Angewandte Chemie, vol. 62, No. 5, pp. 113-4, March 1950.